US012359766B2

(12) United States Patent
Keay et al.

(10) Patent No.: US 12,359,766 B2
(45) Date of Patent: Jul. 15, 2025

(54) MODULAR MONITOR STAND

(71) Applicant: The Skydyne Company, Port Jervis, NY (US)

(72) Inventors: Peter A. Keay, Shohola, PA (US); Richard W. Dansen, Jr., Milford, PA (US)

(73) Assignee: THE SKYDYNE COMPANY, Port Jervis, NJ (US)

( * ) Notice: Subject to any disclaimer, the term of this patent is extended or adjusted under 35 U.S.C. 154(b) by 0 days.

(21) Appl. No.: 18/647,550

(22) Filed: Apr. 26, 2024

(65) Prior Publication Data

US 2024/0384830 A1    Nov. 21, 2024

Related U.S. Application Data

(60) Provisional application No. 63/462,732, filed on Apr. 28, 2023.

(51) Int. Cl.
*F16M 11/04* (2006.01)
*F16M 11/24* (2006.01)

(52) U.S. Cl.
CPC ......... *F16M 11/046* (2013.01); *F16M 11/245* (2013.01); *F16M 2200/027* (2013.01)

(58) Field of Classification Search
CPC ............... F16M 11/046; F16M 11/245; F16M 2200/027

USPC ........................................................ 248/161
See application file for complete search history.

(56) References Cited

U.S. PATENT DOCUMENTS

| | | | | |
|---|---|---|---|---|
| 9,746,128 | B2* | 8/2017 | Huang | F16M 11/22 |
| 10,821,525 | B2* | 11/2020 | Carlson | B25H 1/0064 |
| 2024/0191832 | A1* | 6/2024 | Warren | F16M 11/28 |
| 2025/0003548 | A1* | 1/2025 | Yao | F16M 11/2021 |

* cited by examiner

*Primary Examiner* — Todd M Epps
(74) *Attorney, Agent, or Firm* — Panitch Schwarze Belisario & Nadel LLP

(57) ABSTRACT

A modular monitor stand is configured to support at least one monitor thereon. The modular monitor stand includes a base configured to stabilize the stand upon an underlying surface, the base having a central post. A top mast is removably attached upon the base. The top mast includes an axial post mounted upon the central post and a selectively height adjustable top mounting member configured for mounting a monitor thereon. A clutch system is operatively connected with the top mounting member. The clutch system is configured to disengage in one rotational direction, thereby enabling substantially unimpeded elevational heightening of the top mounting member, and the clutch system is also configured to engage in an opposing rotational direction, corresponding to elevationally lowering the top mounting member, thereby applying resistance to lowering of the mounting member.

20 Claims, 17 Drawing Sheets

MODULAR MONITOR STAND

CROSS-REFERENCE TO RELATED APPLICATION

This application claims priority from similarly-titled U.S. Provisional Patent Application No. 63/462,732, filed Apr. 28, 2023, the entire contents of which are incorporated by reference herein.

BACKGROUND OF THE DISCLOSURE

The disclosure generally relates to a mobile monitor stand, and, more particularly, to a modular, mobile monitor stand.

Mobile media stands are beneficial for presenting information in a variety of settings. For example, without limitation, mobile media stands may be employed in conference rooms or other indoor facilities without native media mounts, in temporarily erected spaces, such as, for example, in military or emergency settings, or in outdoor settings. Depending on the setting, more than one monitor or screen may be required, potentially in large sizes.

It would, therefore, be advantageous to manufacture a modular, mobile monitor stand capable of safely mounting one or more monitors or screens thereto.

BRIEF SUMMARY OF THE DISCLOSURE

Briefly stated, one aspect of the present disclosure is directed to a modular monitor stand configured to support at least one monitor thereon. The modular monitor stand includes a base configured to stabilize the stand upon an underlying surface, the base having a central post. A top mast is removably attached upon the base. The top mast includes an axial post mounted upon the central post and a selectively height adjustable top mounting member configured for mounting a monitor thereon. A clutch system is operatively connected with the top mounting member. The clutch system is configured to disengage in one rotational direction, thereby enabling substantially unimpeded elevational heightening of the top mounting member, and the clutch system is also configured to engage in an opposing rotational direction, corresponding to elevationally lowering the top mounting member, thereby applying resistance to lowering of the mounting member.

BRIEF DESCRIPTION OF THE SEVERAL VIEWS OF THE DRAWINGS

The following description of the disclosure will be better understood when read in conjunction with the appended drawings. It should be understood, however, that the disclosure is not limited to the precise arrangements and instrumentalities shown. In the drawings.

DETAILED DESCRIPTION OF THE DISCLOSURE

Figure 1:
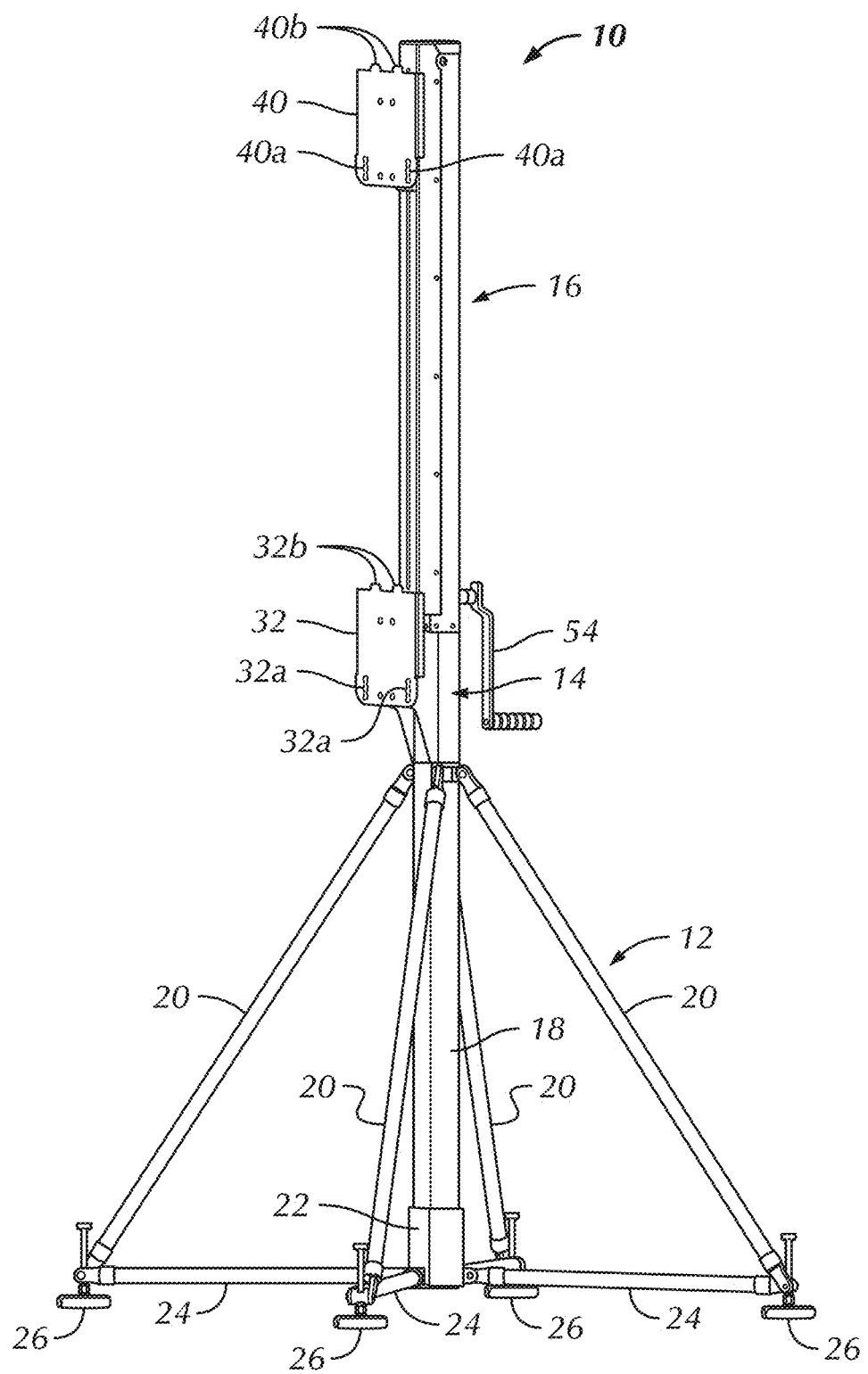
FIG. 1 is a perspective view of a modular monitor stand in accordance with an embodiment of the present disclosure.
Figure 2:
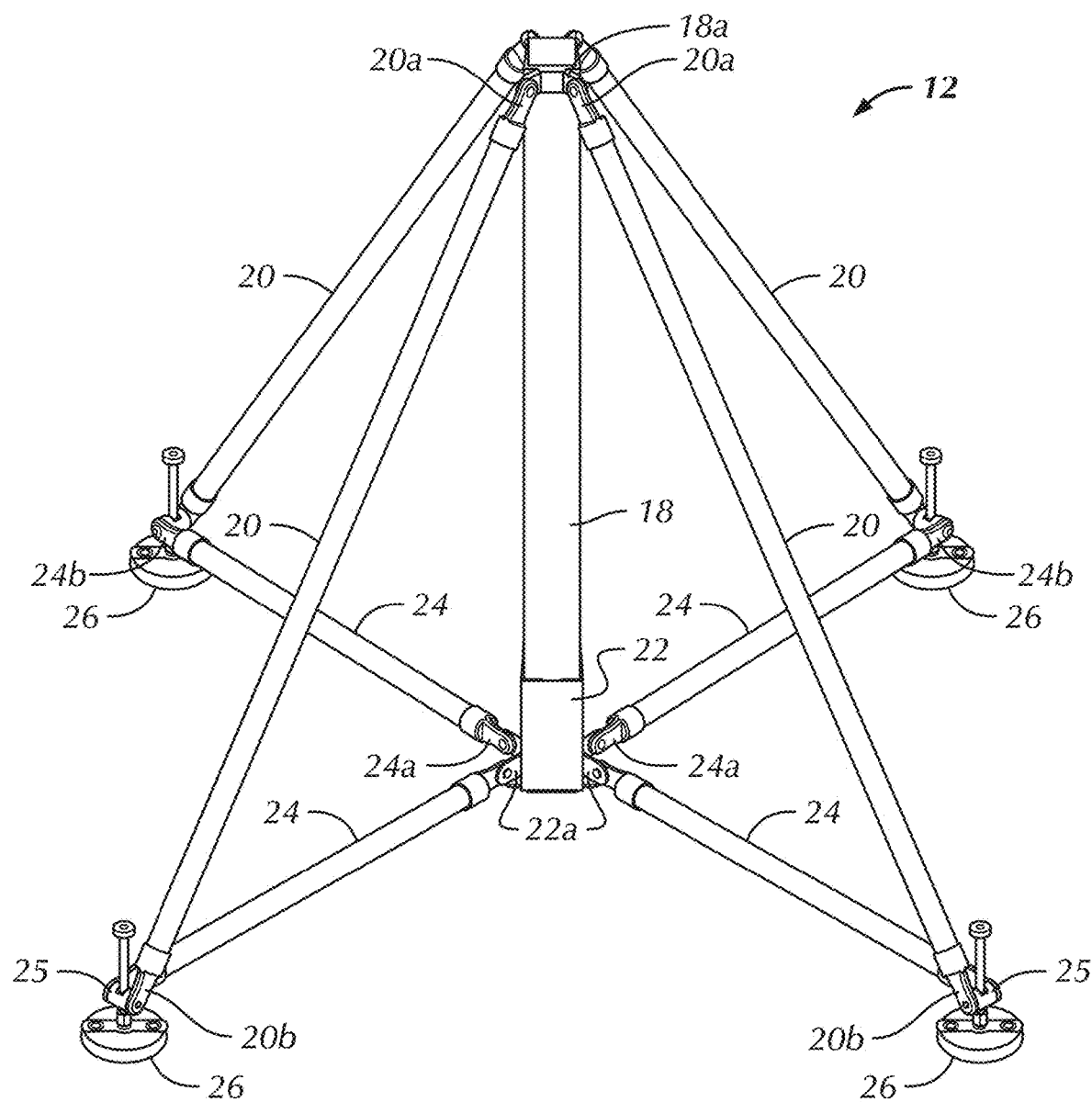
FIG. 2 is a top and side perspective view of a base portion of the modular monitor stand of FIG. 1, the base portion being in an expanded position.
Figure 3:
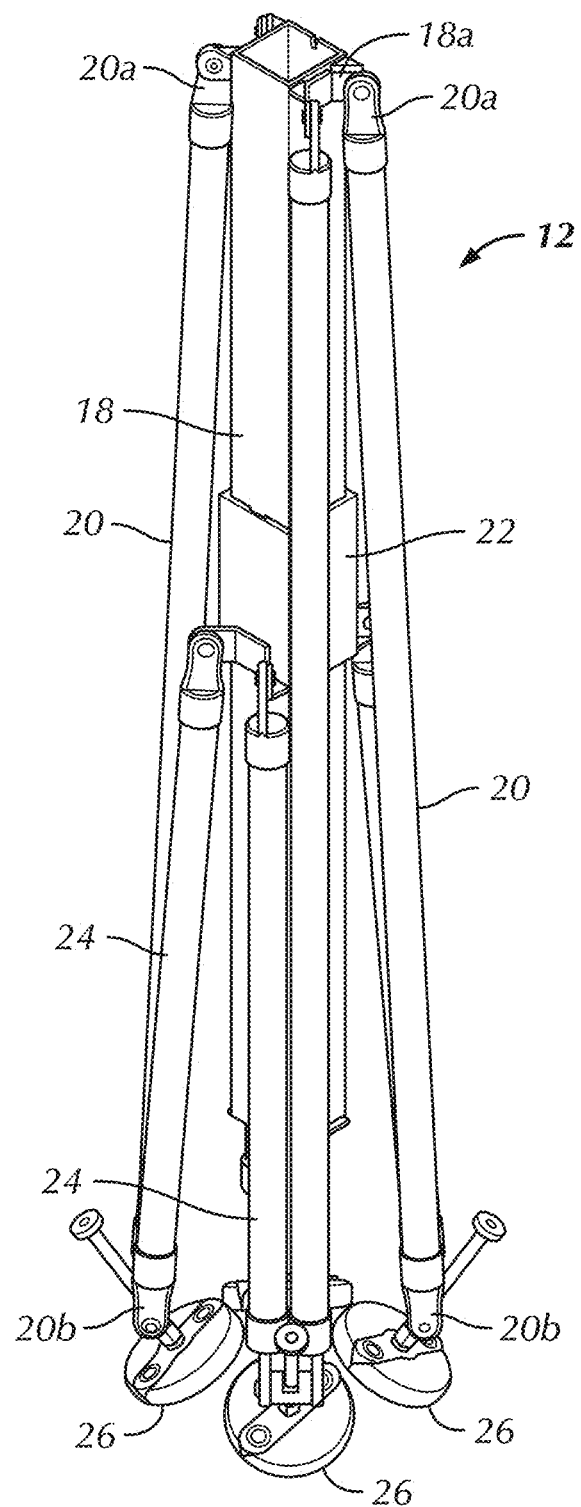
FIG. 3 is a top and side perspective view of the base portion of FIG. 2, the base portion being in a folded position.

Certain terminology is used in the following description for convenience only and is not limiting. The words "lower," "bottom," "upper" and "top" designate directions in the drawings to which reference is made. The words "inwardly," "outwardly," "upwardly" and "downwardly" refer to directions toward and away from, respectively, the geometric center of the stand, and designated parts thereof, in accordance with the present disclosure. In describing the stand, the term proximal is used in relation to the end of the device nearest the underlying ground surface and the term distal is used in relation to the end of the device furthest from the underlying surface. Unless specifically set forth herein, the terms "a," "an" and "the" are not limited to one element, but instead should be read as meaning "at least one." The terminology includes the words noted above, derivatives thereof and words of similar import.

It should also be understood that the terms "about," "approximately," "generally," "substantially" and like terms, used herein when referring to a dimension or characteristic of a component of the disclosure, indicate that the described dimension/characteristic is not a strict boundary or parameter and does not exclude minor variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

Referring to the drawings in detail, wherein like numerals indicate like elements throughout, there is shown in FIGS.

1-17B a modular monitor stand 10, in accordance with an embodiment of the present disclosure, configured to support at least one monitor (not shown) thereon, such as, for example, without limitation, a monitor sized between approximately 50" and approximately 75". As should be understood by those of ordinary skill in the art, monitor size is measured as a diagonal length of the screen thereof, e.g., the length between an upper left-hand corner of the screen to a lower right-hand corner of the screen. As shown in FIG. 1, the modular stand 10 includes modular components: a base 12, a first or middle mast 14, and a second or top mast 16. The base 12, the first mast 14 and the second mast 16 are modularly attachable to form the stand 10, as will be described in further detail. As also will be described, the first (middle) mast 14 is optionally employed, i.e., the top mast 16 may be the primary mast and the middle mast 14 may be a secondary mast or may not be employed.

Turning to FIGS. 1-4, the base 12 takes the form of an expandable (FIGS. 1, 2, 4) and foldable (FIG. 3) quad-pod, but the disclosure is not so limited. That is, the base 12 includes a central post 18 and at least three legs 20 pivotably attached thereto. In the illustrated embodiment, the base 12 include four legs 20 pivotably attached to the central post 18, but may alternatively include three legs 20, i.e., a tripod, or more than four legs 20. As shown, a collar 22 is slidably mounted upon the central post 18 and is reciprocally translatable along the central post 18 during expansion or folding of the base 12. In the illustrated embodiment, the central post 18 and the collar 22 each take the form of a rectangular prism, complementarily dimensioned to generally form a slip fit therebetween. As should be understood by those of ordinary skill in the art, however, the central post 18 and the collar 22 may take the form of different shapes, and may be differently shaped from one another, so long as the collar 22 is reciprocally slidable along the central post 18. In the illustrated embodiment, the central post 18 is hollow, reducing the overall weight of the stand 10, but the disclosure is not so limited. Advantageously, the hollow central post 18 contributes to the ease of mobility of the stand 10.

An upper end 20a of each leg 20 is pivotably attached to the central post 18 proximate an upper end of the central post 18. In the illustrated embodiment, an upper end 20a of each leg 20 is pinned to a corresponding bracket 18a secured proximate an upper end 18b of the central post 18, permitting pivoting, i.e., rotation about the pin, therebetween. As should be understood, however, the upper end 20a of the leg 20 may be pivotably attached to the central post 18, directly or indirectly, via any of numerous different pivot-style attachments currently known or that later become known. A base end 20b of each leg 20 is connected to the collar 22 via a corresponding interconnecting arm 24. In the illustrated embodiment, each arm 24 is pinned, at one end 24a, to a corresponding bracket 22a extending from the collar 22. An opposing end 24b of the arm 24 is pivotably attached to the base end 20b of the corresponding leg 20 via an intervening spacer 25. Therefore, as shown between FIGS. 2 and 3, axial translation/sliding of the collar 22 along the central post 18 rotates the arms 24 between a substantially axial orientation (FIG. 3), i.e., generally parallel with the central post 18, thereby pulling the legs 20 into the (compact) folded position, and a substantially horizontal orientation (FIGS. 1, 2, 4), i.e., generally perpendicular with the central post 18, thereby spreading the legs 20 out into the expanded position.

A foot 26 is threadedly attached to each spacer 25 to stabilize the base 12 upon an underlying surface (not shown), e.g., the ground surface. Each spacer 25 is pinned between the base end 20b of a corresponding leg 20 and the end 24b of a corresponding arm 24. Accordingly, the spacer 25 is rotatable about a central axis extending through the pinned connections. The threaded attachment also enables adjusting the distance between the spacer 25 and the foot 26. Thus, each foot 26 may both rotate (via rotation of the corresponding spacer 25) and also be axially adjusted to account for uneven terrain in the underlying surface. In the illustrated embodiment, the feet 26 take the form of round pucks, but the disclosure is not so limited.

Figure 4:
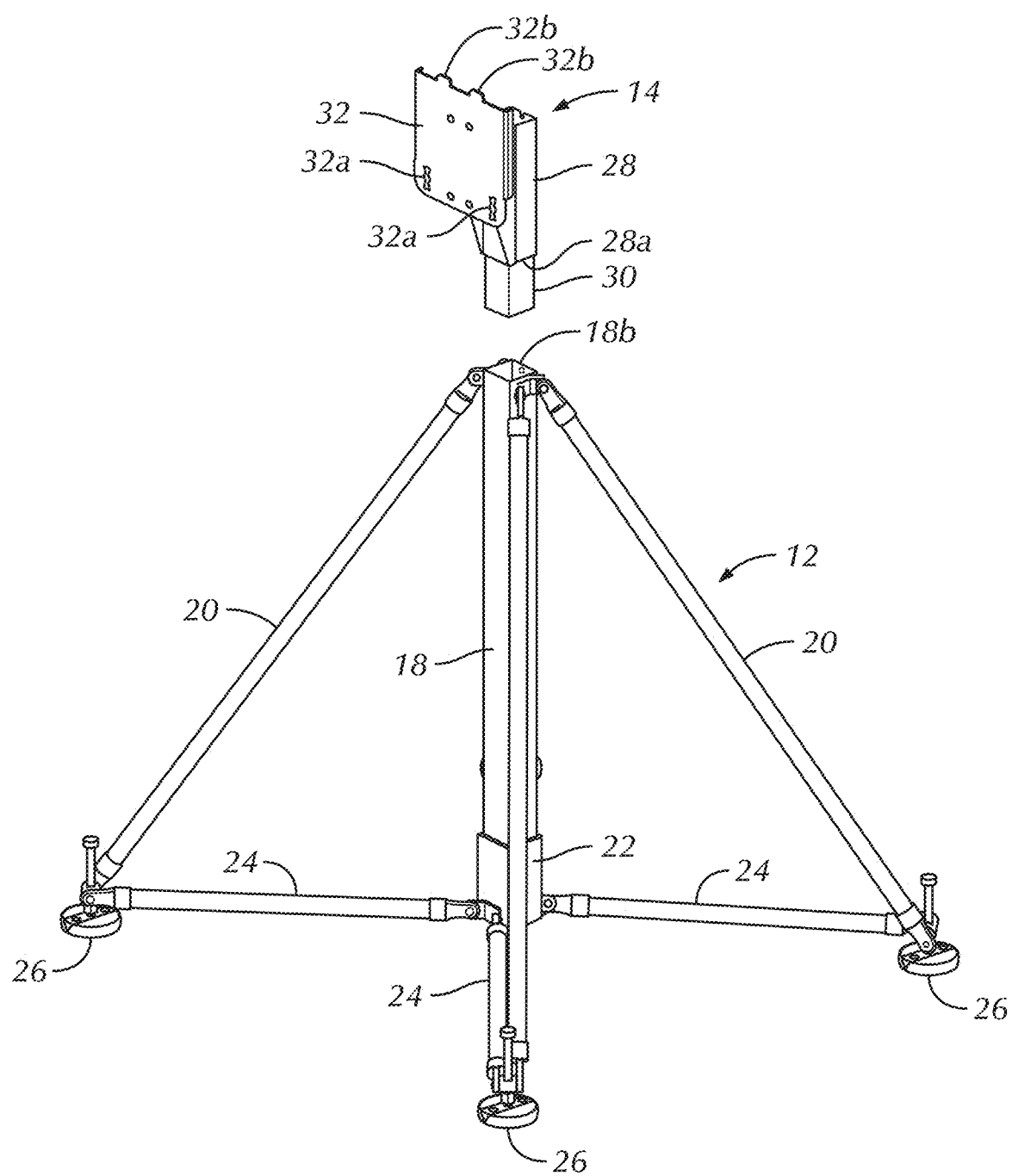
FIG. 4 is a top, front and side perspective exploded view of a first mast and the base portion of FIG. 2, the base portion being in an expanded position.
Figure 5:
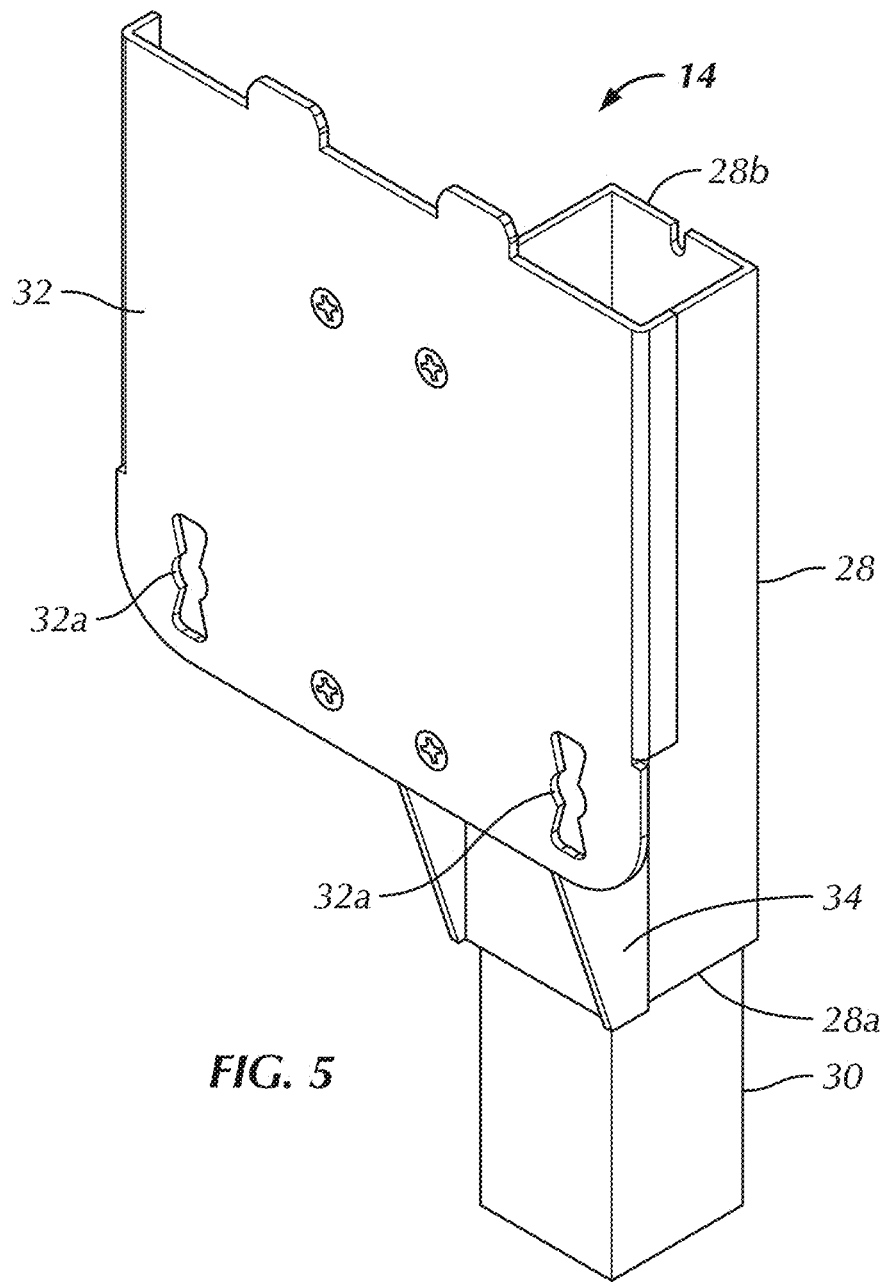
FIG. 5 is a top and side perspective view of the first mast of the modular monitor stand of FIG. 1.
Figure 6:
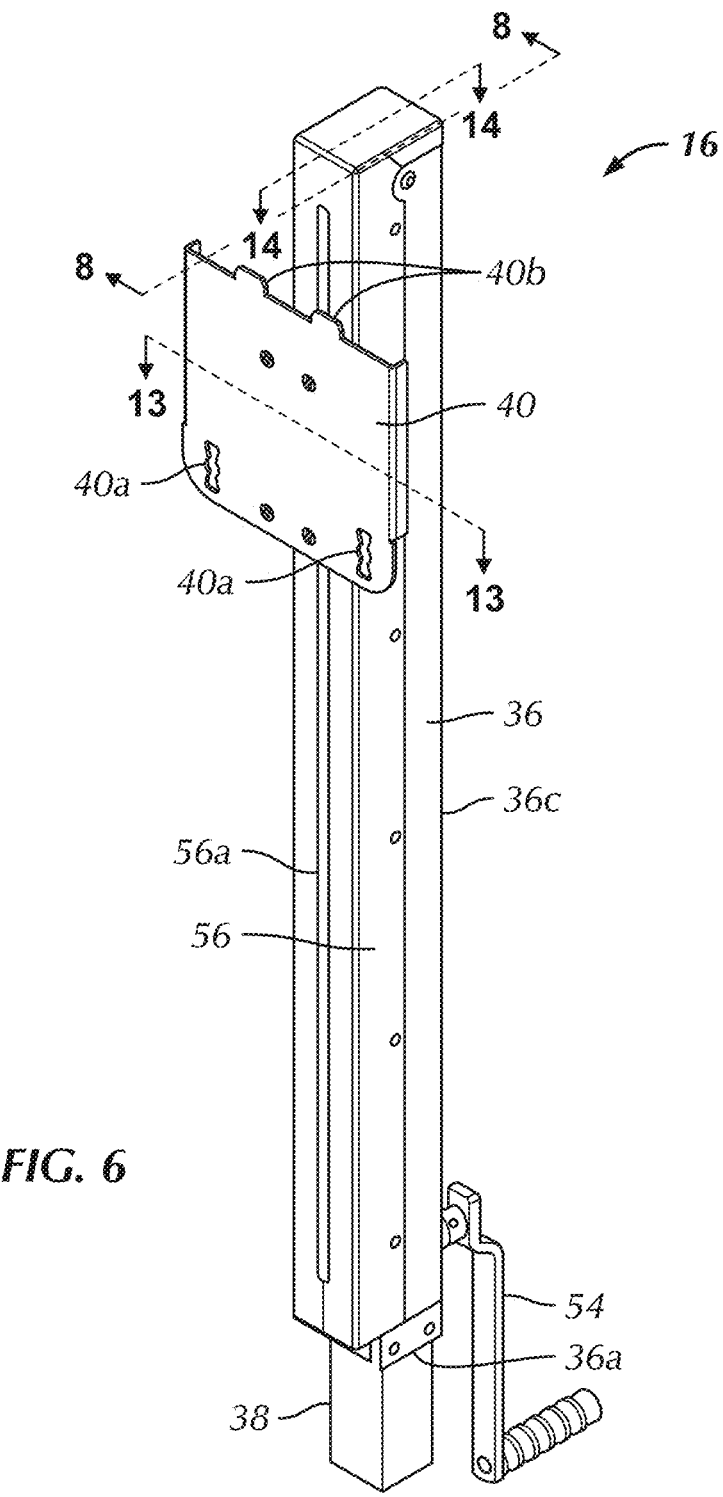
FIG. 6 is a top and side perspective view of a second mast of the modular monitor stand of FIG. 1.

Removably attachable to an open upper end 18b of the central post 18 of the base 12, as shown in FIGS. 1, 4 and 5, is the first mast 14. The first mast 14 includes an open-ended, e.g., hollow, first axial post 28. A first adapter pipe 30 extends from a base end 28a of the first axial post 28 and is insertable into the open upper end 18b of the central post 18 of the base 12 for mounting the first mast 14 upon the base 12. As should be understood, the first adapter pipe 30 is complementarily shaped and dimensioned proximate an upper end thereof to mate with the first axial post 28 of the first mast 14 and the first adapter pipe 30 is also complementarily shaped and dimensioned proximate a base end thereof to slidably mate with the open upper end 18b of the central post 18 of the base 12. In the illustrated embodiment, the first adapter pipe 30 is permanently mated with the first axial post 28 but may alternatively be removably attached to the first adapter pipe 30 in like manner as with the central post 18. In the illustrated embodiment, the first axial post 28 and the central post 18 define the same cross-sectional shape and dimensions in the cross-section perpendicular to the axial extent thereof. Accordingly, the first adapter pipe 30 is uniformly shaped and dimensioned in the same cross-section throughout the axial length thereof, but the disclosure is not so limited. The first adapter pipe 30 is slidable into the central post 18 until the base end of the first axial post 28 abuts the upper end 18b of the central post 18, whereby the first adapter pipe 30 is no longer externally visible. Alternatively, the depth of the engagement between the first adapter pipe 30 and the central post 18 may be adjustable to provide height adjustment to the first mast 14 relative to the base 12.

The first mast 14 further includes a first mounting member 32 fixedly secured to the first axial post 28. In the illustrated embodiment, the mounting member 32 takes the form of a plate, but the disclosure is not so limited. Rather, the mounting member 32 may take the form of any bracket, frame, platform, mount, body, surface, a combination thereof or the like, capable of performing the function(s) of the mounting member 32 described herein, e.g., configured for mounting a monitor thereon. In the illustrated embodiment, a spacer bar 34 projects forwardly from the first axial post 28 and the mounting member 32 is fastened to the spacer bar 34. The spacer bar 34 may be welded to the first axial post 28, formed as a single piece (monolithic) with the first axial post 28, or otherwise permanently fixed to the first axial post 28. As should be understood, however, the spacer bar 34 is optional and the first mounting member 32 may be directly secured to the first axial post 28. Additionally, or alternatively, two or more of the first axial post 28, the spacer bar 34 and the first mounting member 32 may be formed as a single monolithic component. The first mounting member 32 includes at least one first mounting aperture 32a for mounting a monitor thereto as well as at least one first mounting tab 32b projecting upwardly from the member 32, as will be described in further detail below. In the illustrated embodiment, the first mounting member 32 includes two first mounting apertures 32a formed proximate opposing sides of the first mounting member 32 and two first mounting tabs 32b, but the disclosure is not so limited, as the first mounting member 32 may have one, three or more first mounting apertures 32a formed in different areas of the first mounting member 32 and additionally or alternatively have one, three or more first mounting tabs 32b. In the illustrated embodiment, the first mounting aperture(s) 32a take the shape of a vertically oriented wingnut, but the disclosure is not so limited.

Referring now to FIGS. 1 and 6-9, removably attachable to an open upper end 28b of the first axial post 28 of the first mast 14 is the second mast 16. The second mast 16 also includes an open-ended, e.g., hollow, second axial post 36. A second adapter pipe 38 extends from a base end 36a of the second axial post 36 and is insertable into the open upper end 28b of the first axial post 28 for mounting the second mast 16 upon the first mast 14. As should be understood, the second adapter pipe 38 is complementarily shaped and dimensioned proximate an upper end thereof to mate with the second axial post 36 and is also complementarily shaped and dimensioned proximate a base end thereof to slidably mate with the open upper end 28b of the first axial post 28. In the illustrated embodiment, the second adapter pipe 38 is fastened to the second axial post 36 but may permanently attached to the second axial post 36 via any manner currently known or that later becomes known, e.g., welding, bonding, or the like, or alternatively be removably attached to the second axial post 36.

In the illustrated embodiment, the first and second axial posts 28, 36 define the same cross-sectional shape and dimensions in the cross-section perpendicular to the axial extent thereof. Accordingly, the second adapter pipe 38 is uniformly shaped and dimensioned in the same cross-section throughout the axial length thereof, but the disclosure is not so limited. The second adapter pipe 38 is slidable into the first axial post 28 until the base end 36a of the second axial post 28 abuts the upper end 28b of the first axial post 28, whereby the second adapter pipe 38 is no longer externally visible. Alternatively, the depth of the engagement between the second adapter pipe 38 and the first axial post 28 may be adjustable. In one alternative configuration, the first mast 14 may not be utilized and the second mast 16 may be removably mounted directly upon the open upper end 18b of the central post 18 of the base 12 in the same manner as the first mast 14 may be mounted upon the central post 18, i.e., the second adapter pipe 38 extends from the base end 36a of the second axial post 36 and into the open upper end 18b of the central post 18.

The second mast 16 also includes a height adjustable second mounting member 40 mounted to an axially movable support platform 50 (see FIGS. 9, 10, 12, 13). In the illustrated embodiment, the second mounting member 40 takes the form of a plate, but the disclosure is not so limited. Rather, the second mounting member 40 may take the form of any bracket, frame, platform, mount, body, surface, a combination thereof or the like, capable of performing the function(s) of the mounting member 40 described herein, e.g., configured for mounting a monitor thereon. In the illustrated embodiment, the second mounting member 40 is fastened to at least one transverse standoff 51 projecting forwardly from a first plate 50a of the support platform 50. In the illustrated embodiment, four standoffs 51 project laterally forwardly from the support platform 50, but the disclosure is not so limited, as two, three or more than four standoffs 51 may project from the support platform 50. As also should be understood by those of ordinary skill in the art, the second mounting member 40 may be mounted to the support platform 50 via any of numerous different mounting mechanisms currently known or that later become known, or alternatively, may be formed as a single component with a component of the support platform 50.

The second mounting member 40 takes substantially the same form as the first mounting member 32. That is, the second mounting member 40 includes at least one second mounting aperture 40a for mounting a monitor thereto as well as at least one second mounting tab 40b projecting upwardly from the second mounting member 40, as will be described in further detail below. In the illustrated embodiment, the second mounting member 40 includes two second mounting apertures 40a formed proximate opposing sides of the second mounting member 40 and two second mounting tabs 40b, but the disclosure is not so limited, as the second mounting member 40 may have one, three or more second mounting apertures 40a formed in different areas of the second mounting member 40 and additionally or alternatively have one, three or more second mounting tabs 40b. In the illustrated embodiment, the second mounting aperture(s) 40a take the shape of a vertically oriented wingnut, but the disclosure is not so limited.

As shown best in FIGS. 7-11 and 13, a driving mechanism for the height adjustable second mounting member 40 includes at least one upper sprocket 42 positioned within the second axial post 36, proximate an upper end 36b and at least one lower sprocket 44 positioned within the second axial post 36, proximate the second adapter pipe 38. The sprockets 42, 44 are pinned or fastened to the second axial post 36 in a rotatable manner to spin about the respective central axes thereof (see, e.g., FIG. 15). At least one linkage 46, e.g., a chain, a belt or the like, operatively links, e.g., mechanically, the upper sprocket 42 with the corresponding lower sprocket 44 in a manner well understood by those of ordinary skill in the art, whereby spinning of the sprockets 42, 44 drives the linkage 46 up and down. In the illustrated embodiment, a pair of upper sprockets 42, a pair of lower sprockets 44 and a pair of chains 46 are employed for added reliability/redundancy of the driving mechanism, but the disclosure is not so limited. That is, each set of corresponding upper and lower sprockets 42, 44 are connected together by a respective chain 46.

Figure 9:
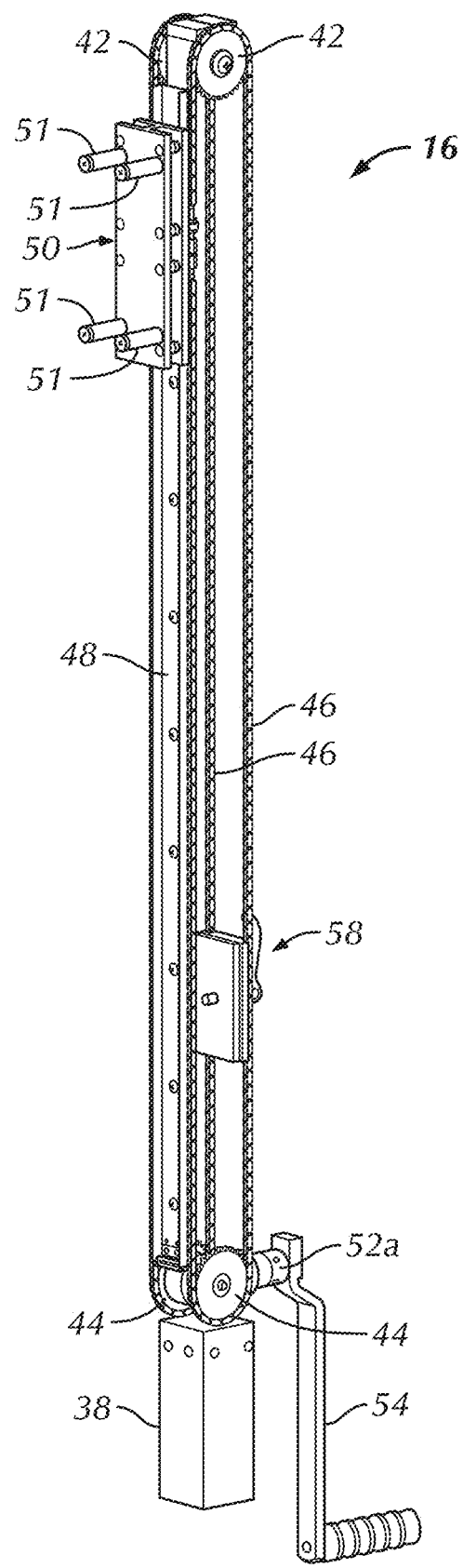
FIG. 9 is a top, front and side perspective view of the second mast of FIG. 6, with the external covering thereof removed.
Figure 10:
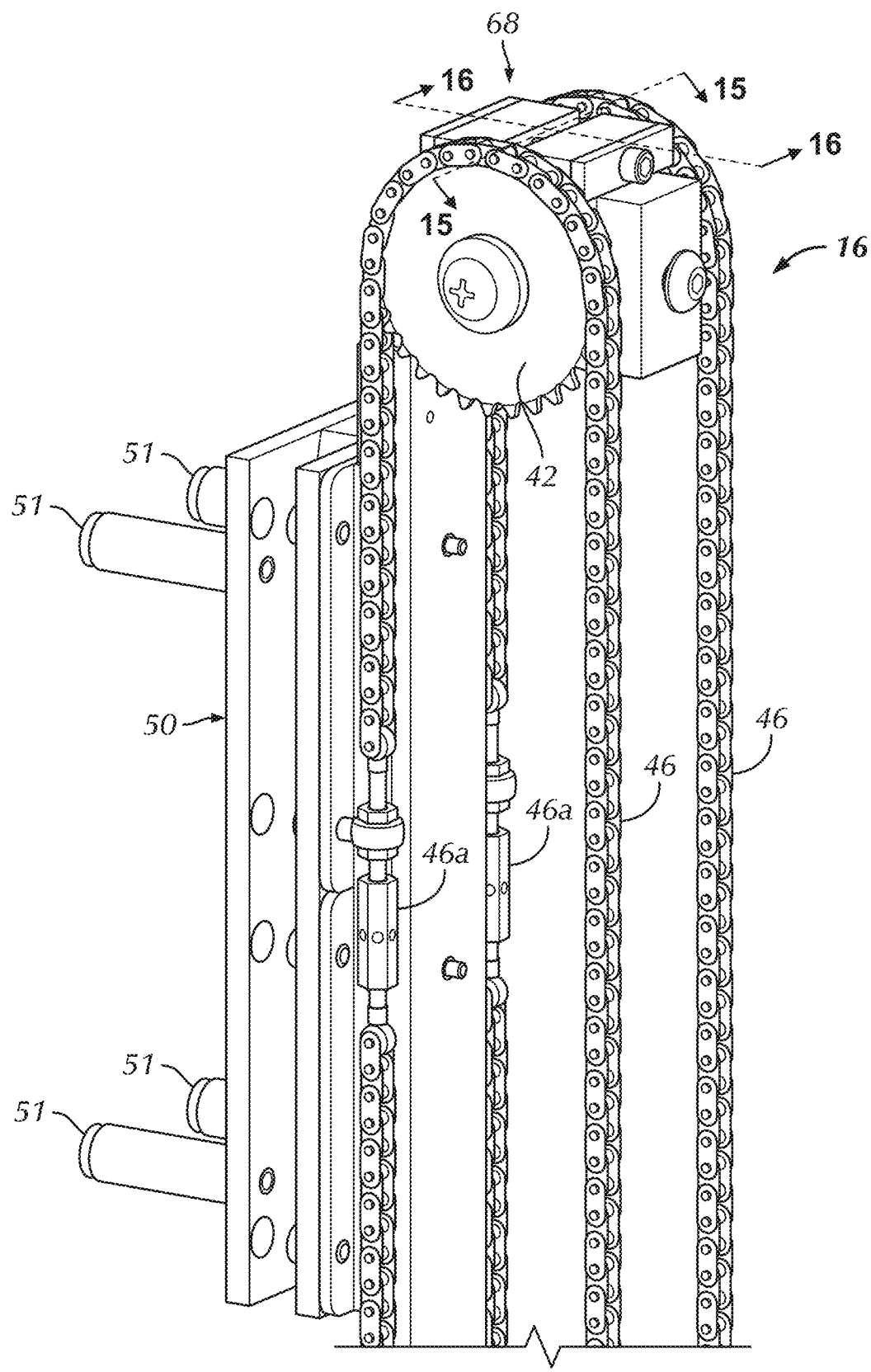
FIG. 10 is an enlarged, top, back and side partial perspective view of the second mast of FIG. 6, with the external covering thereof removed.
Figure 11:
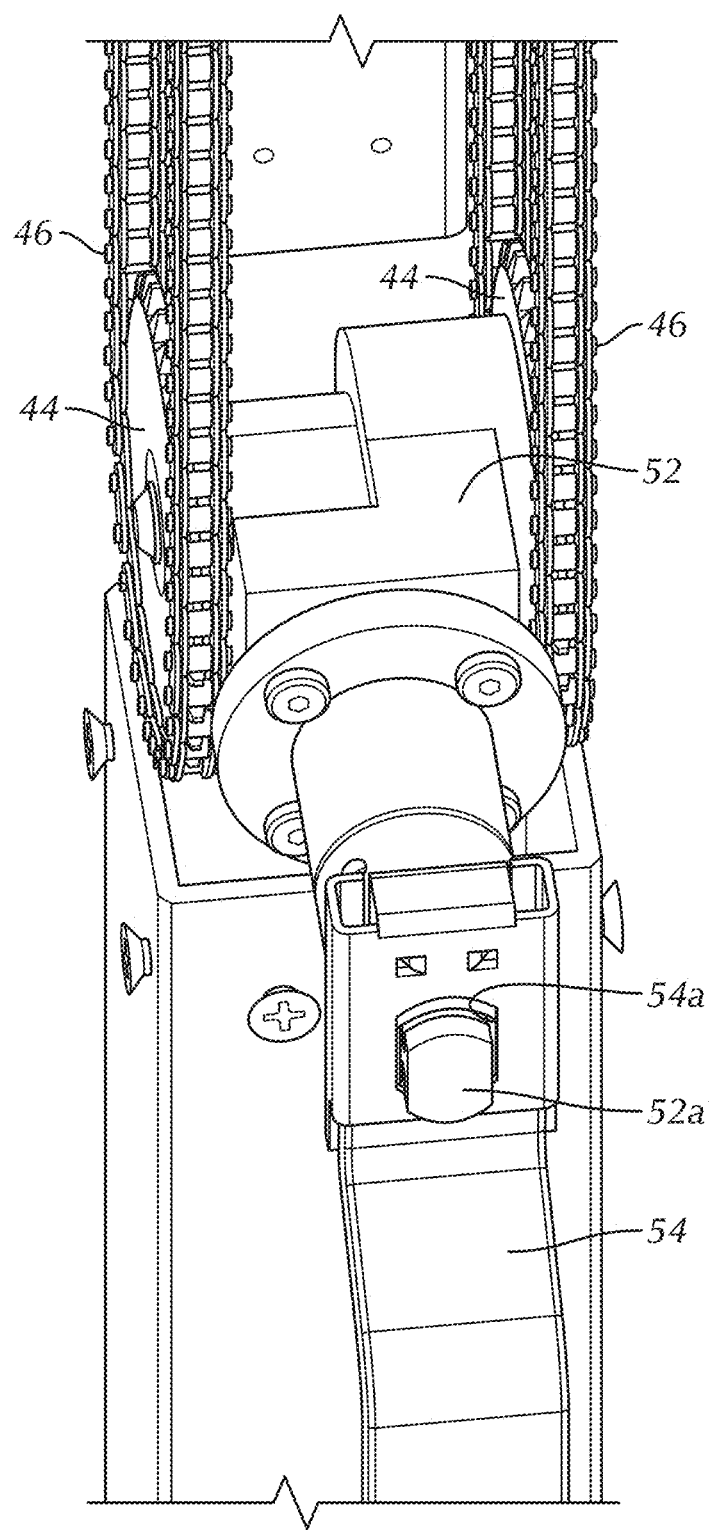
FIG. 11 is an enlarged, back and side partial perspective view of the second mast of FIG. 6, showing a bevel gear assembly and handle thereof.
Figure 12:
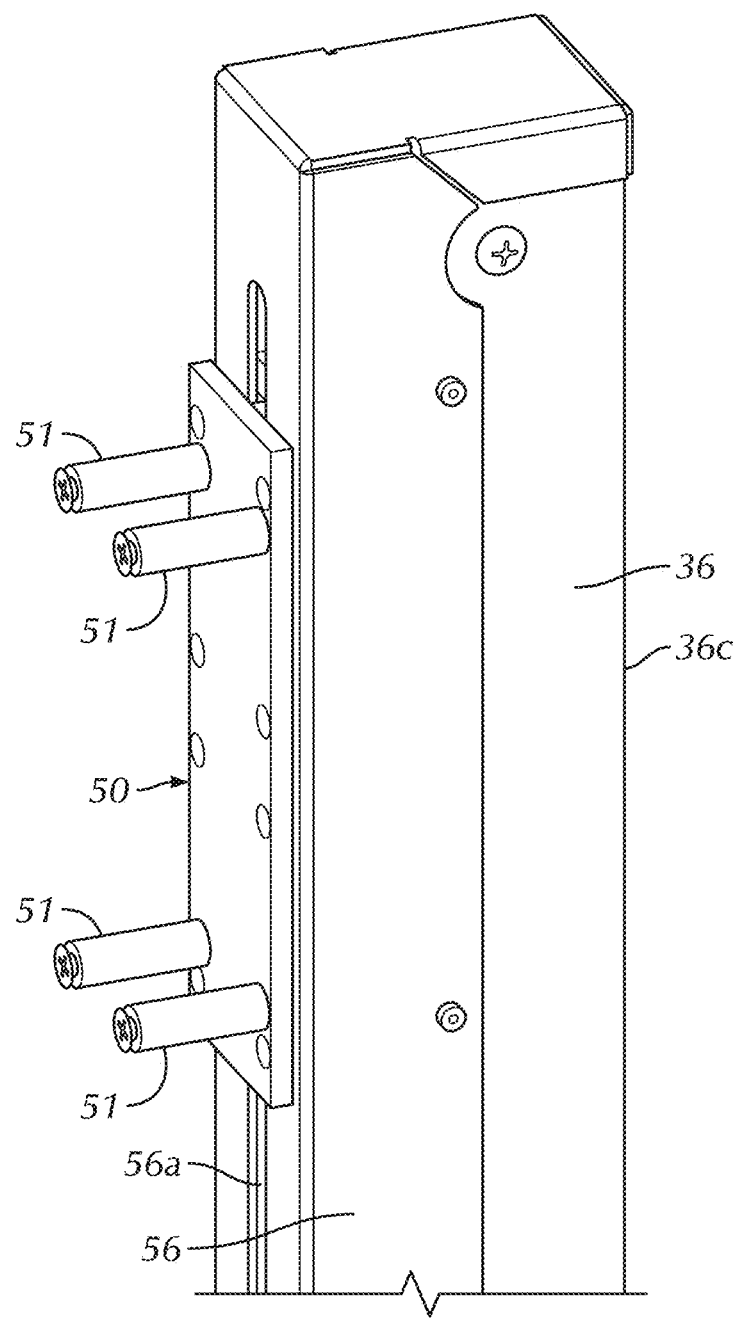
FIG. 12 is an enlarged, top, front and side partial perspective view of the second mast of FIG. 6, showing an upper end thereof.
Figure 13:
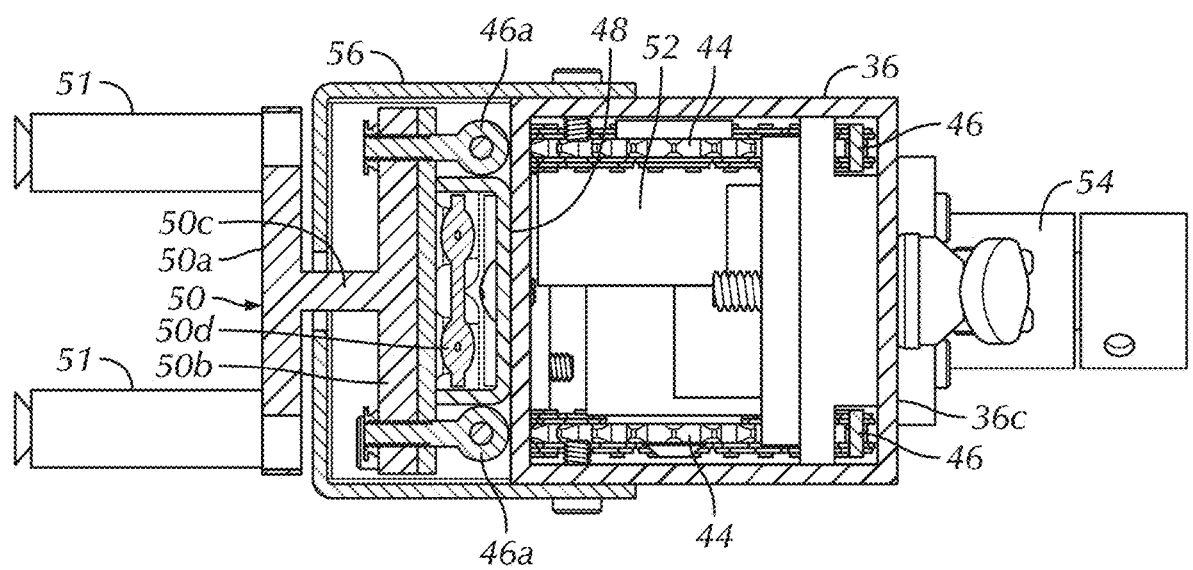
FIG. 13 is a cross-sectional view of the second mast of FIG. 6, taken along sectional line 13-13 of FIG. 6.

As shown best in FIG. 9, a rail 48 axially extends between the upper pair of sprockets 42 and the lower pair of sprockets 44. In the illustrated embodiment, the rail 48 is generally U-shaped in a cross-section perpendicular to the axial extent thereof The support platform 50 is slidably engaged with the rail 48 and secured to the linkage 46, whereby movement of the linkage 46 slides the support platform 50 up and down the rail 48. As shown in FIGS. 10 and 13, each linkage 46 includes an adapter 46a, e.g., a T-shaped adapter, connected in-line with the linkage 46 and fastened to a rear end of the support platform 50, e.g., fastened to the plate 50b of the support platform 50. As should be understood, however, the support platform 50 may be secured to the linkage 46 via other methods currently known or that later become known. In the illustrated embodiment, as shown best in FIG. 13, a carriage 50d projects rearwardly from a plate 50b of the support platform 50 and into slidable engagement with the rail 48, but the disclosure is not so limited. In the illustrated embodiment, the carriage 50d takes the form of (or at least includes) a linear or sliding bearing.

To drive the linkage 46, the lower pair of sprockets 44 form components of a bevel gear assembly 52 (FIG. 11) configured to drive the lower pair of sprockets 44, and, in turn, the linkage(s) 46, in synced timing with one another. As should be understood, however, the bevel gear assembly 52 may alternatively be formed with the upper pair of sprockets 42. The bevel gear assembly 52 includes a lug 52a projecting therefrom. In the illustrated embodiment, the lug 52a projects rearwardly relative to the second axial post 36 to not interfere with the mounting member(s) 32, 40 or the monitors mounted thereon. A handle 54 is removably attachable in a rotationally fixed manner with the lug 52a, in a key-keyseat complementary arrangement. In the illustrated embodiment, the handle 54 includes an aperture or socket 54a to receive a complementary portion of the lug 52a therein/therethrough. As should be understood, the handle 54 may alternatively include a lug or the like and the bevel gear assembly 52 may include a complementary socket. Alternatively, the bevel gear assembly 52 and the removably attachable handle 54 may be engaged in a rotatably fixed manner via any rotationally fixed engagement means currently known or that later becomes known. In a further alternative configuration, a handle may be removably and directly engageable with the lower pair of sprockets 44 or the upper pair of sprockets 42, in a rotatably fixed manner.

To adjust the elevation of the second mounting member 40, a user mounts the handle 54 onto the lug 52a and cranks/rotates the handle 54 about the elongate axis of the lug 52a, which, in turn (via the bevel gear assembly 52) rotates the lower pair of sprockets 44 about the central axis extending therethrough and between. Rotation of the lower pair of sprockets 44 drives the linkage 46 between the lower pair of sprockets 44 and the upper pair of sprockets 42, which, in turn, elevates or lowers the attached support platform 50 and the second mounting member 40 (along the rail 48) according to the direction of rotation of the handle 54.

Figure 15:
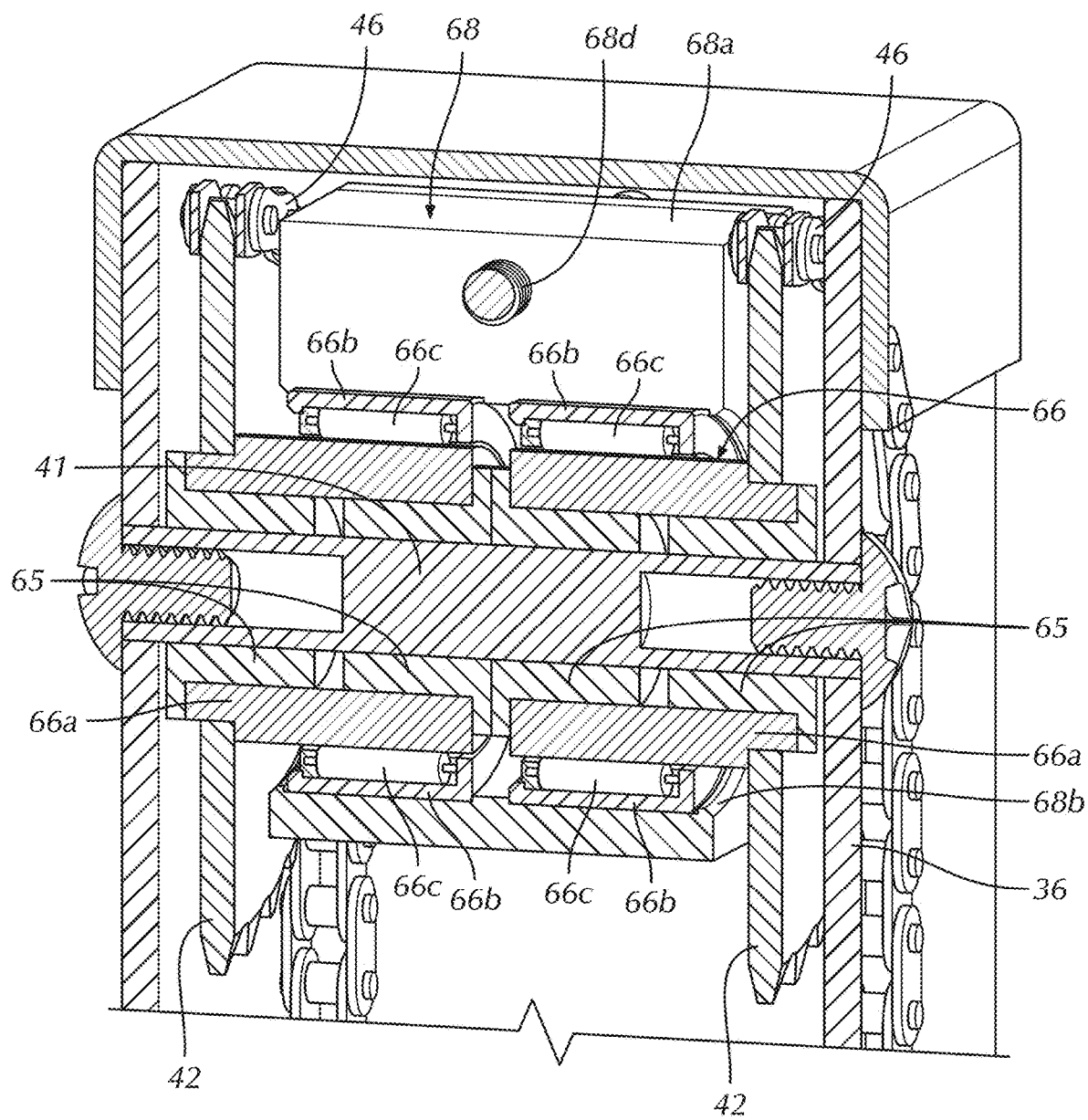
FIG. 15 is a perspective, cross-sectional via of a one-way clutch of the second mast of FIG. 6, taken along the line 15-15 of FIG. 10.
Figure 16:
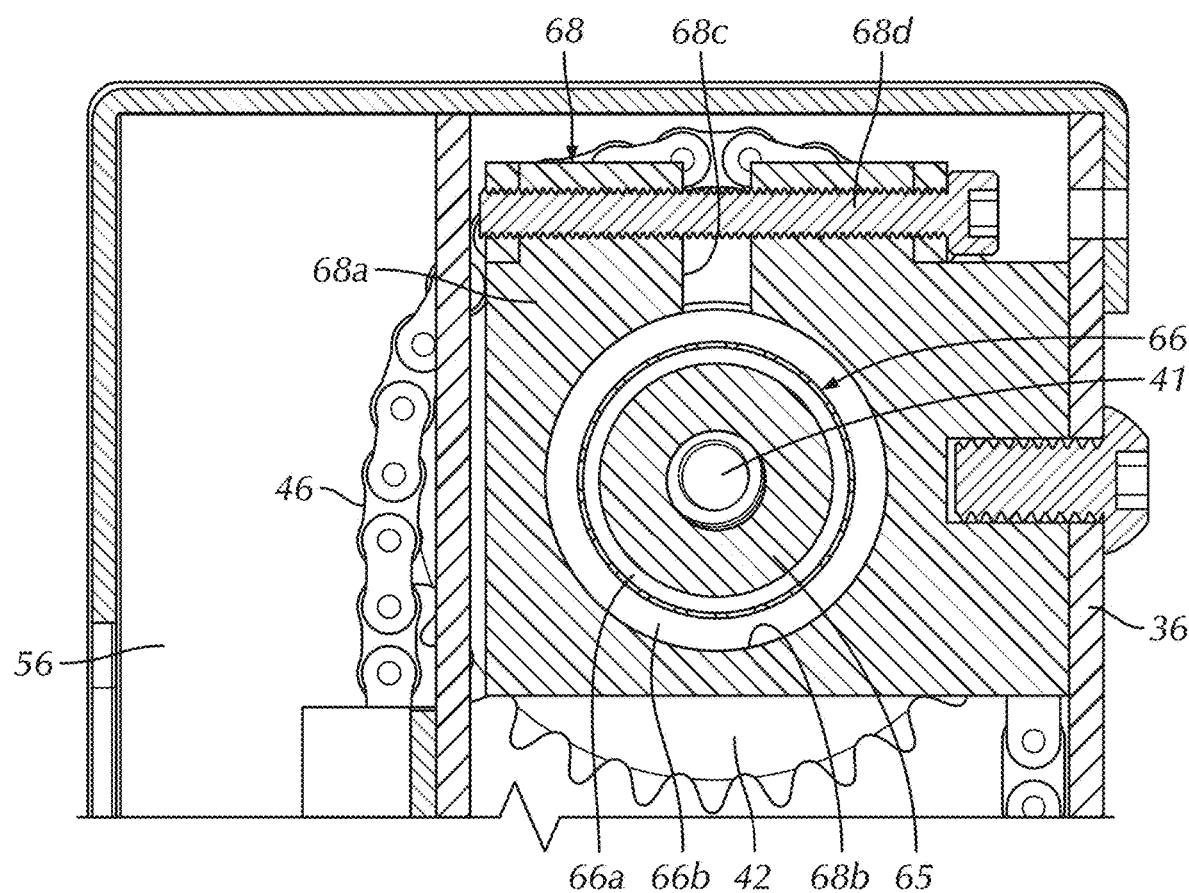
FIG. 16 is an elevational, cross-sectional via of the one-way clutch of the second mast of FIG. 6, taken along the line 16-16 of FIG. 10.

As shown best in FIGS. 15 and 16, a one-way roller clutch system 66 is employed with the upper pair of sprockets 42 and is configured to permit substantially free rotation of the sprockets 42, e.g., clockwise rotation thereof as viewed in FIG. 16, when raising the height adjustable second mounting member 40, and configured to engage/activate when lowering the mounting member 40, e.g., via counterclockwise rotation of the sprockets 42. As shown in FIG. 15, the clutch system 66 includes an inner race/ring 66a (per sprocket 42) an outer race/ring 66b (per sprocket 42) and roller bearings 66c, e.g., sprags/cams, mounted between the respective inner and outer races 66a, 66b. Each sprocket 42 is mounted in a rotationally fixed manner to a respective inner race 66a, e.g., via an interference fit therebetween or the like. As should be understood by those of ordinary skill in the art, rotation of the inner race(s) 66a (due to rotation of the respective sprockets 42) in one rotational direction permits the roller bearings 66c to freely rotate between the corresponding inner and outer races 66a, 66b, thereby permitting the inner race 66a to rotate separately from the outer race 66b. Conversely, rotation of the inner race(s) 66a in the opposite rotational direction wedges the roller bearings 66c between the corresponding inner and outer races 66a, 66b, thereby engaging the inner and outer races 66a, 66b with one another for synchronized rotation together. Accordingly, when the sprockets 42 are rotated to raise the mounting member 40, the clutch system 66 is not engaged/activated and the inner race(s) 66a rotates freely from the outer race(s) 66b. When the sprockets 42 are rotated in the opposite direction to lower the mounting member 40, the clutch system 66 is engaged/activated, whereby the inner and outer races 66a, 66b are both engaged and rotated together. In one configuration, the clutch system 66 may be a drawn cup needle roller clutch bearing, Koyo RC-162110FS;PB;L068, manufactured by JTEKT Corporation.

As shown in FIG. 10, the one-way roller clutch system 66 is mounted within an adjustable clamp 68 positioned between the upper pair of sprockets 42. A shaft 41 extends through the clutch system 66 and the adjustable clamp 68 and is fastened to opposing sides of the second axial post 36 to mount the clutch system 66 and the adjustable clamp 68 within the second axial post 36. Bearings 65 are positioned between the shaft 41 and the inner race(s) 66a to permit rotation of the inner race(s) around the rotationally fixed shaft 41. As shown in FIG. 16, a block 68a of the adjustable clamp 68 may also be directly fastened to the second axial post 36.

In the illustrated embodiment (FIG. 16), the adjustable clamp 68 takes the form of the block 68a having a through-bore 68b for receiving the clutch system 66 therethrough. The block 68a generally takes the form of a pipe clamp, defining an open-ended slot 68c extending parallel to the through-bore 68b and extending from the through-bore 68b to an upper end of the block 68a, thereby splitting an upper end of the block 68a into two ears. A fastening screw 68d (FIG. 16) is threadedly engaged with the block 68a, extending across the slot 68c, whereby the fastening screw 68d may be adjustably threaded to selectively narrow or widen the slot 68c, and, in turn, loosen or tighten the through-bore 68b around the clutch system 66, i.e., increase or decrease the frictional force thereon. Advantageously, therefore, the through-bore 68b may be selectively tightened around the clutch system 66 to apply a frictional force upon the outer race(s) 66b countering rotation thereof. Thus, a selectively weighted counter force may be applied upon the outer race(s) 66b to prevent free rotation thereof in the rotational direction that would otherwise cause the mounting member 40 to freely fall under the gravitational force of the weight of a mounted monitor or other screen thereon. Rather, an additional user applied force is required when the user actively rotates the handle 54 in order to overcome the clamping force of the clamp 68 and lower the mounting member 40.

Figure 7:
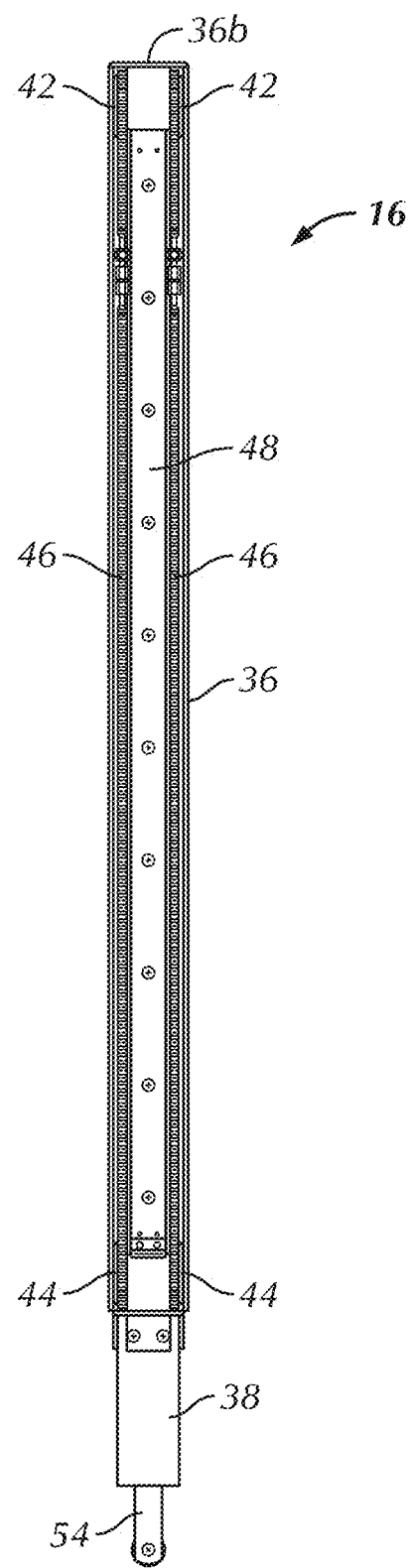
FIG. 7 is a front elevational view of the second mast of FIG. 6, with a cover of the second mast removed.
Figure 8:
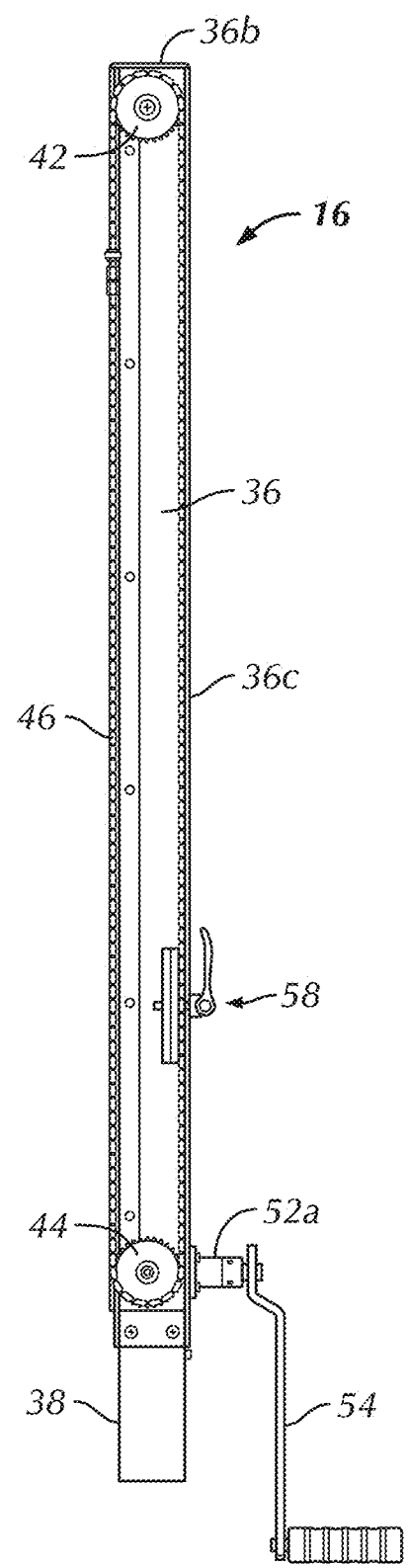
FIG. 8 is a partial, cross-sectional view of the second mast of FIG. 6, taken along the sectional line 8-8 of FIG. 6.

Turning to FIG. 7, it can be seen that the second axial post 36 defines an open front side (i.e., the side adjacent the support platform 50). As shown best in FIGS. 6 and 12, a cover 56 is mounted upon the open front side of the second axial post 36. In the illustrated embodiment, the cover 56 is fastened to the second axial post 36, but the disclosure is not so limited, as the cover 56 may be attached to the second axial post 36 via other means currently known or later becomes known. The cover 56 includes an axially extending slot 56a through which the support platform 50 protrudes. As shown best in FIG. 13, the support platform 50 defines an I-shape or H-shape in cross-section, having wide first and second plates or flanges 50a, 50b, with a relatively narrower connecting portion or web 50c. The second plate 50b is obscured behind the cover 56 and the first plate 50a is positioned forward of the cover 56, with the connecting portion 50c projecting through the slot 56a of the cover 56. The connection portion 50c and the slot 56a are correspondingly dimensioned to permit axial translation/sliding of the connection portion 50c, and, in turn, the support platform 50, through and along the slot 56a. Optionally, the slot 56a may include horizontally extending bristles (not shown) therein to minimize entry of contaminants into the second axial post 36 where the driving components are employed.

Figure 14:
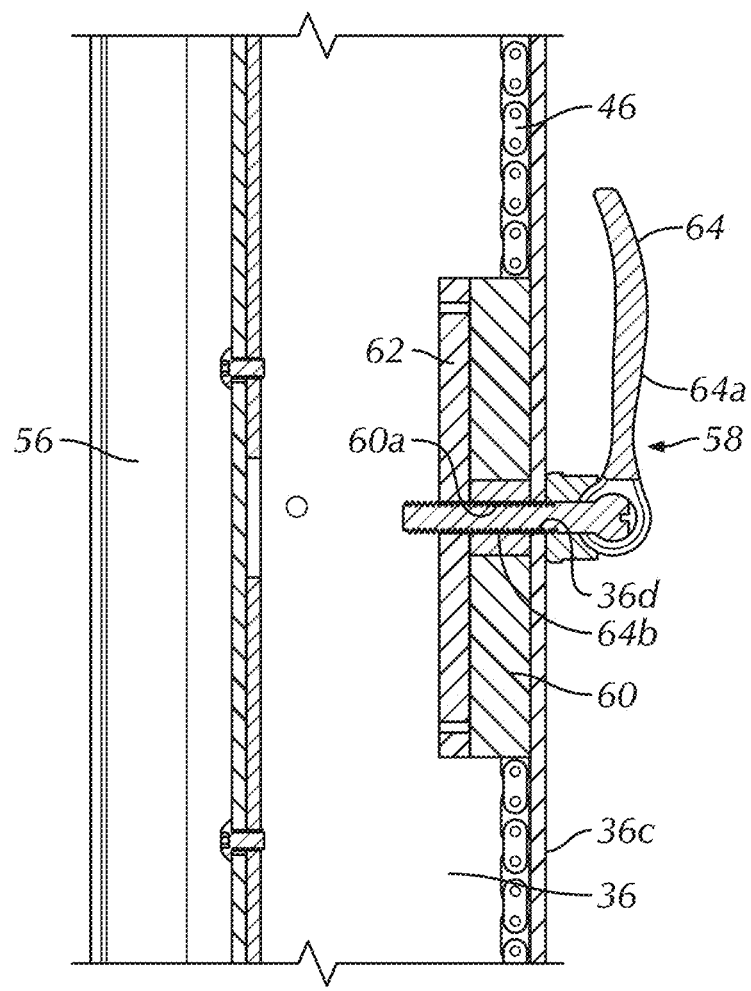
FIG. 14 is a cross-sectional view of the second mast of FIG. 6, taken along sectional line 14-14 of FIG. 6.

Optionally, a brake system 58 (see FIGS. 8, 9, 14) may be employed with the second mast 16 to further secure the elevational position of the support platform 50. In one configuration, the brake system 58 may be configured to substantially prevent movement of the linkage 46. Alternatively, the brake system may be configured to prevent rotation of any or all of the sprockets 42, 44. In the illustrated embodiment, as shown best in FIG. 14, the brake system 58 includes a brake pad 60 and a brake pad backing plate 62 employed within the second axial post 36, and a cam clamp 64 positioned outside the second axial post 36, opposite the rear wall 36c of the second axial post 36 from the brake pad backing plate 62 and the brake pad 60. The brake pad 60 is positioned facing the linkage 46 and opposite the linkage 64 from the rear wall 36c. The cam clamp 64 includes a lever 64a rotatably pinned to a threaded stud 64b. As should be understood by those of ordinary skill in the art, the lever 64a is rotatably pinned to the threaded stud 64b along an off-center pin axis forming a thicker end side and a thinner end side, or the end of the lever 64a proximate the pinned, threaded stud 64b is eccentrically shaped to have a thicker end side and a thinner end side, either of which enables a camming action The threaded stud 64b extends through a thru-hole 36d in the rear wall 36c of the second axial post 36 and through a thru-hole 60a in the brake pad 60 and into threaded engagement with the backing plate 62. Accordingly, the lever 64a is rotated with the threaded stud 64b about the axis of the threaded stud 64b to engage the brake pad backing plate 62 and subsequently pull the backing plate 62 and the brake pad 60 toward the rear wall 36c for adjustment of the brake system. In an assembled, unlocked position (not shown), i.e., when the thinner end side of the lever 64a engages the opposing stationary surface, there is clearance between the linkage 46 and the brake pad 60 and the rear wall 36c permitting movement of the linkage 46. When the lever 64a is selectively rotated relative to the threaded stud 64b along the pin axis to the locked position (FIG. 14), i.e., when the thicker end side of the lever 64a engages the opposing stationary surface, the threaded stud 64b is pulled back, thereby pulling the brake pad backing plate 62 toward the rear wall 36c of the second axial post 36. In turn, the brake pad 62 clamps the linkage 46 against the rear wall 36c, substantially inhibiting movement of the linkage 46.

Figure 17A:
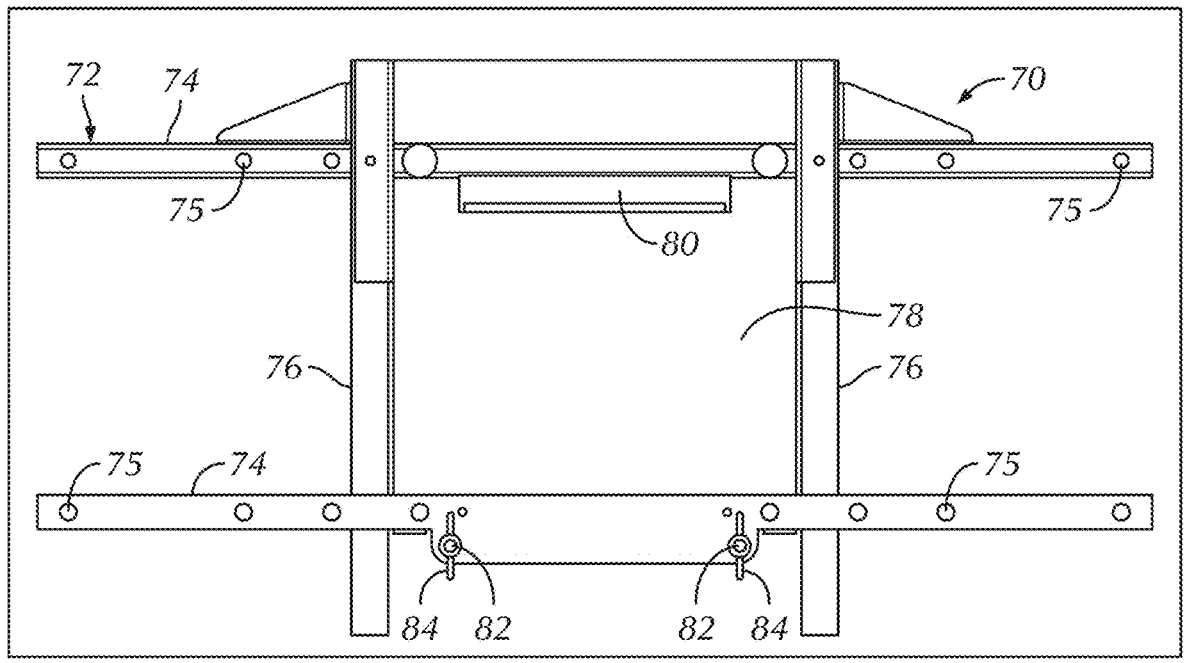
FIG. 17A is an elevational view of a monitor mount employed for mounting a monitor to the modular monitor stand of FIG. 1.
Figure 17B:
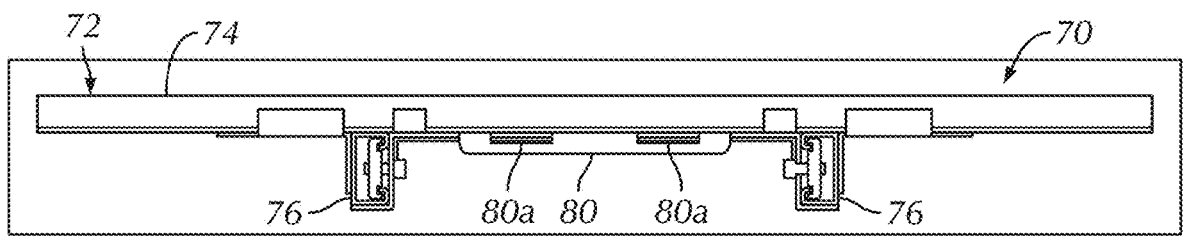
FIG. 17B is a top plan view of the monitor mount of FIG. 17B.

To mount a monitor to the monitor stand 10, a monitor mount 70 is attached to the back of the monitor. As shown in FIGS. 17A and 17B, the monitor mount 70 includes a mounting frame 72 for fastening to the back of the monitor. The frame 72 includes upper and lower, parallel horizontal frame legs 74 connected by left and right, parallel vertical frame legs 76. The frame legs 74, 76 include a plurality of spaced apart fastening apertures 75 for fastening the monitor mount 70 to the monitor therethrough. As should be understood, some or all of the fastening apertures 75 may be utilized, depending on alignment with corresponding fastening apertures of the monitor. A connecting plate 78 extends between the left and right, vertical legs 76. The connecting plate 78 includes a horizontal and rearwardly projecting ledge 80 proximate an upper end thereof, positioned between the left and right, vertical legs 77. The ledge 80 includes two ledge apertures 80 sized and positioned for receiving the first or second mounting tabs 32b, 40b therethrough. The connecting plate 78 also includes a pair of threaded studs 82 projecting rearwardly therethrough and having respective wingnuts 84 threadedly mounted thereon. The threaded studs 82 and the attached wingnuts 84 are positioned to align with the first or second mounting apertures 32a, 40a when the monitor mount 70 is mounted to the first or second mounting members 32, 40.

To mount a monitor upon the monitor stand 10, the monitor mount 70 is first attached to a monitor (as previously described). The monitor is then aligned with the monitor stand 10 such that the connecting plate 78 is in an adjacent, facing position with the first mounting member 32 (if attaching the monitor to the first mast 14) or in an adjacent, facing position with the second mounting member 40 (if attaching the monitor to the second mast 16). The ledge apertures 80 are first aligned with, and mounted upon, the respective mounting tabs 32b or 40b of the first mounting member 32 or the second mounting member 40, whereby the mounting tabs extend through the ledge apertures 80. The wingnuts 84, in a vertical orientation, are then aligned and advanced through the respective vertically oriented, wing-nut-shaped mounting apertures 32a or 40a of the first mounting member 32 or the second mounting member 40. The wingnuts 84 are subsequently rotated into a horizontal orientation to lock the monitor mount 70 to the respective mounting member 32, 40. To mount two monitors to the monitor stand 10, an upper monitor is mounted to the second mounting member 40 and a lower monitor is subsequently mounted to the first mounting member 32. The second mounting member 40 may be lowered to mount a monitor thereto and subsequently elevated (as previously described via the handle 54). Upon elevating the second mounting member 40 to an adequate height, the brake system 58 may be applied, as previously described. Another monitor may then be mounted to the first mounting member 32.

It will, therefore, be appreciated by those skilled in the art that various modifications and alterations could be made to the disclosure above without departing from the broad inventive concepts thereof. Some of these have been discussed above and others will be apparent to those skilled in the art. It is understood, therefore, that this invention is not limited to the particular embodiments disclosed, but it is intended to cover modifications within the spirit and scope of the present disclosure, as set forth in the appended claims.

We claim:

1. A modular monitor stand configured to support at least one monitor thereon, the modular monitor stand comprising:
   a base configured to stabilize the stand upon an underlying surface, the base comprising a central post; and
   a top mast removably attached upon the base, the top mast comprising:
   an axial post mounted upon the central post;
   a selectively height adjustable top mounting member configured for mounting a monitor thereon; and
   a clutch system operatively connected with the top mounting member, the clutch system being configured to disengage in one rotational direction, thereby enabling substantially unimpeded elevational heightening of the top mounting member, and the clutch system also being configured to engage in an opposing rotational direction, corresponding to elevationally lowering the top mounting member, thereby applying resistance to lowering of the mounting member.

2. The modular monitor stand of claim 1, further comprising a brake system configured to selectively secure the elevational position of the top mounting member.

3. The modular monitor stand of claim 1, wherein the resistance applied by the clutch system when engaged is selectively user adjustable.

4. The modular monitor stand of claim 1, wherein the clutch system comprises a one-way roller clutch system.

5. The modular monitor stand of claim 4, wherein the one-way roller clutch system is mounted within an adjustable clamp, the adjustable clamp being selectively loosened or tightened around an outer race of the clutch system, thereby selectively adjusting the resistance applied by the clutch system when engaged.

6. The modular monitor stand of claim 1, further comprising a driving mechanism including at least one upper sprocket rotatably fastened to the axial post, a corresponding at least one lower sprocket rotatably fastened to the axial post, and a corresponding at least one linkage connecting the respective upper and lower sprockets, whereby rotation of the sprockets drives the linkage, the top mounting member being connected to the linkage.

7. The modular monitor stand of claim 6, further comprising a brake system including a brake pad opposing the at least one linkage, the brake pad being selectively actuatable between a position spaced from the at least one linkage and a position clamping and substantially inhibiting movement of the at least one linkage.

8. The modular monitor stand of claim 6, further comprising a handle connected to the upper sprocket or the lower sprocket for manually and selectively rotating the respective sprocket, and, in turn, driving the driving mechanism.

9. The modular monitor stand of claim 6, wherein the handle is connected to the upper sprocket or the lower sprocket via a bevel gear assembly.

10. The modular monitor stand of claim 6, wherein the handle is removably attached to the upper sprocket or the lower sprocket.

11. The modular monitor mount of claim 1, wherein the top mounting member comprises a plate having at least one of a mounting aperture or a mounting tab.

12. The modular monitor stand of claim 1, wherein the axial post of the top mast is open-ended and hollow.

13. The modular monitor stand of claim 1, wherein the top mast further comprises an adapter pipe extending from a base end of the axial post, the adapter pipe being removably insertable into an open, upper end of the central post of the base.

14. The modular monitor stand of claim 1, wherein the top mast is removably attached directly upon the base.

15. The modular monitor stand of claim 1, wherein the base further comprises at least three legs, each pivotably attached to the central post and movable relative to the central post between a folded position and an expanded position.

16. The modular monitor stand of claim 1, further comprising a middle mast removably attachable between the base and the top mast.

17. The modular monitor stand of claim 16, wherein the middle mast comprises an axial post and a middle mounting member secured to the axial post of the middle mast, the middle mounting member configured for mounting a monitor thereon.

18. The modular monitor stand of claim 17, wherein the middle mounting member comprises a plate having at least one of a mounting aperture or a mounting tab.

19. The modular monitor stand of claim 17, wherein the axial post of the middle mast is open-ended and hollow.

20. The modular monitor stand of claim 17, wherein the middle mast further comprises an adapter pipe extending from a base end of the axial post thereof, the adapter pipe being removably insertable into an open, upper end of the central post of the base, and the axial post of the top mast being removably insertable into an open, upper end of the axial post of the middle mast.

* * * * *